United States Patent [19]
Huff

[11] 3,988,243
[45] Oct. 26, 1976

[54] RISER BOX

[76] Inventor: Kenneth O. Huff, 200 Townsend Building, Casper, Wyo. 82601

[22] Filed: Sept. 30, 1974

[21] Appl. No.: 510,146

[52] U.S. Cl. .............................. 210/297; 210/320; 210/389; 210/456; 209/269
[51] Int. Cl.² ......................................... B01D 33/00
[58] Field of Search ........... 210/388, 389, 297, 303, 210/305, 312, 313, 320, 340, 519, 521, 456, DIG. 12, DIG. 18; 209/269, 262–264, 267

[56] References Cited
UNITED STATES PATENTS

| | | |
|---|---|---|
| 2,039,573 | 5/1936 | Weber ............................... 210/389 |
| 2,716,493 | 8/1955 | Hutchison ...................... 209/269 X |
| 2,750,043 | 6/1956 | Thompson ...................... 209/269 X |
| 3,154,485 | 10/1964 | Liddell ............................ 210/340 X |
| 3,852,197 | 12/1974 | Thompson ...................... 210/389 X |

Primary Examiner—John Adee

[57] ABSTRACT

Spent drilling mud riser box construction maintaining a selected high mud level for test and gravity flow to a sand sampling device and an alternately used shale shaker in which the shale shaker when operating will screen both spent drilling fluid and the residual flow from the sand sampling device.

20 Claims, 8 Drawing Figures

RISER BOX

This invention relates to an improved constant mud level chamber or riser box for drilling muds and to its combination with a sand sampling device, and an alternately used shale shaker or similar mud treating device, to maintain a selected level of drilling mud in the riser box for test purposes as well as to provide gravity flow to said devices.

In normal rotary drilling, a drilling mud consisting of clays and viscosity controlling components suspended in a liquid, is pumped through the drill stem and over the rotary drill bit to cool and lubricate the same. The mud has its viscosity and gravity adjusted to seal the hole and pick up rock or shale cuttings, suspending and returning them to the surface in a continuous flow as the earth boring proceeds. For this purpose, the density, specific gravity, pH, viscosity, electric resistivity, temperature, solids and hydrocarbons content and the like are measured for several purposes including control of its properties to a selected optimum for deep well drilling and return of the cuttings to the surface. On return, the mud will be tested for reconditioning to its normal composition before returning cyclically to the drill stem in continued use. The mud is pumped down the hole through the drill string, thence through the drill bit and returned to the surface with any solids, liquids and gases picked up in the circulation cycle. When the mud returns to the surface, it is passed to a riser box which is an antechamber, a preliminary container, from which the mud passes to a shale shaker. The shale shaker is a vibrating screen intended to sift out the larger stone, shale or earth particles suspended in the mud.

For this purpose, the riser box should have substantial depth for purposes first of allowing deep enough immersion of various test instruments in the flowing mud for effective readings of its condition as it passes to the top of the shale shaker in gravitational flow. The shale shaker often becomes clogged with particles of rock, shale or earth and the like, and does not operate well in any case in very cold weather. Again, in periods of lost circulation, the shale shaker use is usually discontinued, and the mud flow desirably then by-passes the shale shaker from time to time quite often. When the shale shaker is by-passed, normally by opening a valve or gate near the bottom of the riser box, the mud level of the riser box is lowered uncovering test instruments suspended in the mud, thus interfering with the continuing testing of the mud properties.

Again, it is desirable also to pass a portion of the spent mud stream to the sample collecting device for purposes of removing rock samplings from the suspended solids for further test, such sampling device being generally of the type shown by my U.S. Pat. No. 3,662,897. That sample recovering device is designed to take a side stream of the spent mud treating, such as by gravity separating the cuttings from the mud, and return of the treated portion of the sampling stream of spent mud back to the main stream for further processing, preferably passing it over a shale shaker when available or alternately to return the remainder to the mud pit for recycle to the well.

According to the present invention, the riser box is provided with a partitioning element which separates the riser box into a mud supply chamber and a mud disposal chamber and extends vertically from side to side of the riser box to a selected height therein whereby the upper edge operates as a weir. Thus, the mud passed to the box rises in the supply chamber to a selected level, adjustable corresponding to the height of the partition and overflows it as a weir at the selected height, toward the mud disposal chamber. This construction of the riser box allows for continuous mud flow to the riser box and provides the flow of mud therein with a hydrostatic head rising to the selected level of mud in which to immerse test instruments mounted for mud immersion near the top of the riser box. That raised level of mud also allows gravity flow over the weir into the distribution chamber from which it flows onto a shaker screen when it is ready for use. That raised mud level also allows gravity flow as a side stream to the sand sampling collecting device, from which the mud flow, after removal of some test cuttings, may be returned to the main spent mud stream also passing either through the shale shaker screen or, when the shale shaker is not in use, back to the total mud flow stream passing to the mud pit. When the shale shaker is inactive or inoperative, that partitioned chamber portion, formed as the mud disposal chamber, passes the mud outward of that chamber portion of the riser box, returning it to a mud pit for further treatment and recycle to the well.

Thus, the riser box hereof is actually a combined constant fluid level riser chamber in the forward portion and an alternate distribution chamber in an after portion, the latter to distribute the fluid alternately to a shale shaker screen when it is in use or to by-pass the flow of the mud together with the residual mud flow from the sand sampling device to the mud pit. For this purpose the mud level chamber may be separately partitioned from the mud distribution chamber by a single partition separating integral chamber units, or these chambers may be independently separated by walls and mounted adjacent to each other, one to receive the mud flows from the next as separate or separatable chambers. For the latter, they may be slightly spaced as separately housed chambers only close enough to receive mud flow, one from the other.

The invention is further described with relation to the drawings wherein:

FIG. 8 shows a modified constant mud level tank and an alternate mud distribution chamber modified for mounting to a pair of shale shakers.

As shown in the drawings, the spent mud flows from the well through a spent mud main supply duct 10, entering the constant mud level chamber riser box 12 at a point near or slightly above the bottom. Normally solids will not settle in the riser box in suffucent quantity to restrict the mud flow through the system. The plumbing in the mud system is so constructed that the velocity of the mud, gravity flowing down the flowline, maintains sufficient energy to carry all of the solids in suspension and thus out of the box.

Figure 7:
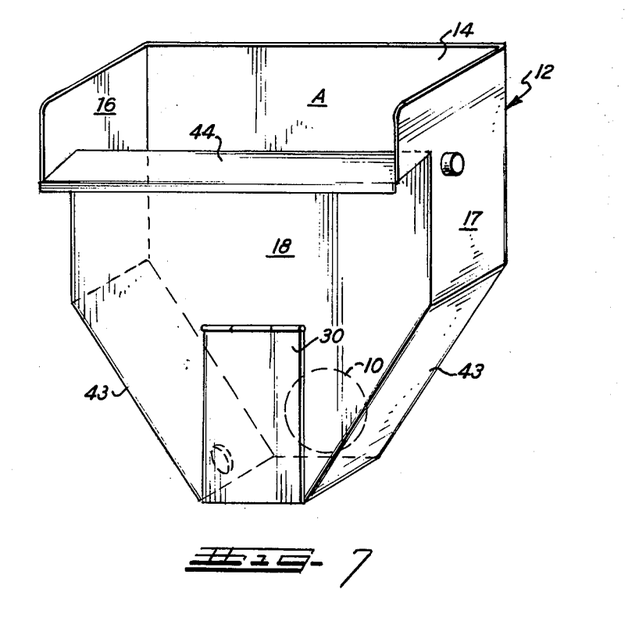
FIG. 7 is a perspective view of the constant mud level chamber of FIGS. 5 and 6.

Riser box 12 as shown here can be a rectangular box for most economical structure, but may be of any shape and of substantial depth to accommodate the necessary hydrotatic head of drilling mud to provide the gravity flow. Somewhat greater velocity is imparted to the flow, reducing the tendency of solids to settle by shaping the bottom more narrowly preferably as a hopper as shown in FIG. 7 through which entering mud flows from narrower cross-section to broader. Thus, the box consists of front and rear ends 14 and 15 and two sides 16 and 17. A partition 18, rising to an intermediate height is mounted to extend from side 16, to opposite side 17 thus separating the riser box into a mud supply chamber A and overflow mud disposal chamber B on opposite sides of the partition 18.

Figure 5:
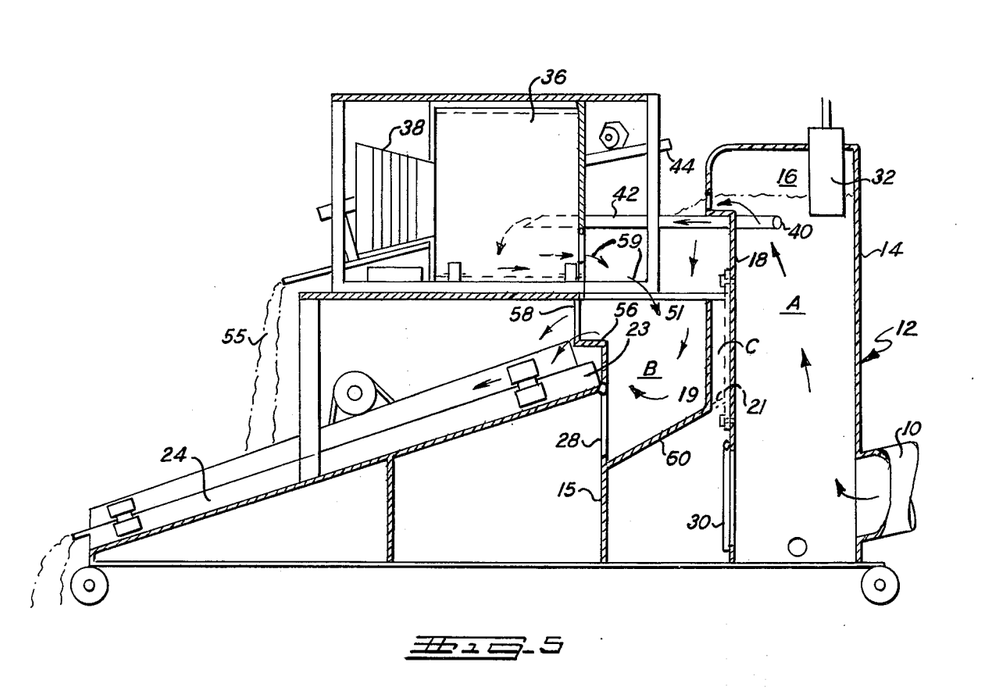
FIG. 5 is a side elevation of an assembly including a modified type of constant level chamber having a built in weir and showing mud through both the sand sampling and shale shaker.
Figure 6:
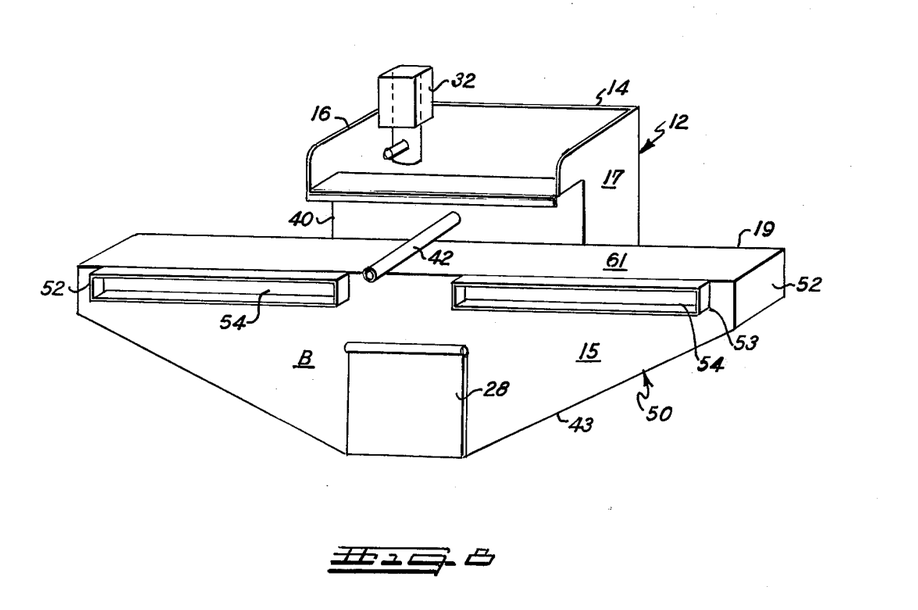
FIG. 6 is the same assembly as FIG. 5 showing the alternate mud flow with the shale shaker inoperative.

As shown in a modified form in FIGS. 5–8, the partitioning wall 18 need not be an integral wall separating the two chambers A and B but rather each chamber can be separately housed, and the chamber B will have its own rear partitioning wall 19 mounted as by bolting separately to the wall 18 as shown in the dotted line portion 21 of FIG. 6. Alternately, as shown in FIG. 5 the chamber B may be spaced by a space C from the chamber A as a separate and independent container of FIGS. 5 and 6. The container B in any case will be positioned close, the space being small enough to the chamber A to receive the mud flow and distribute the same in the alternate flow directions of the arrows as will appear.

Figure 1:
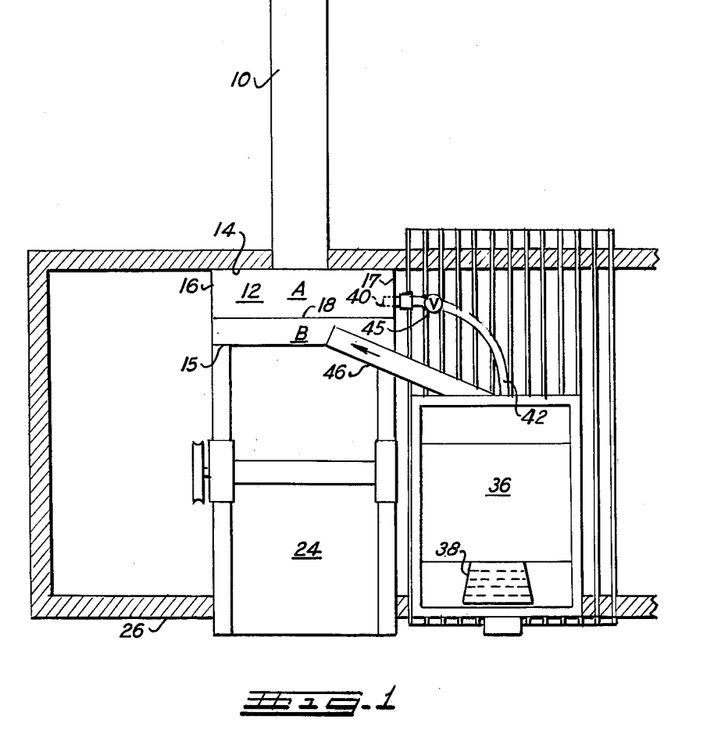
FIG. 1 is a top plan view of the several apparatus elements as combined.
Figure 2:
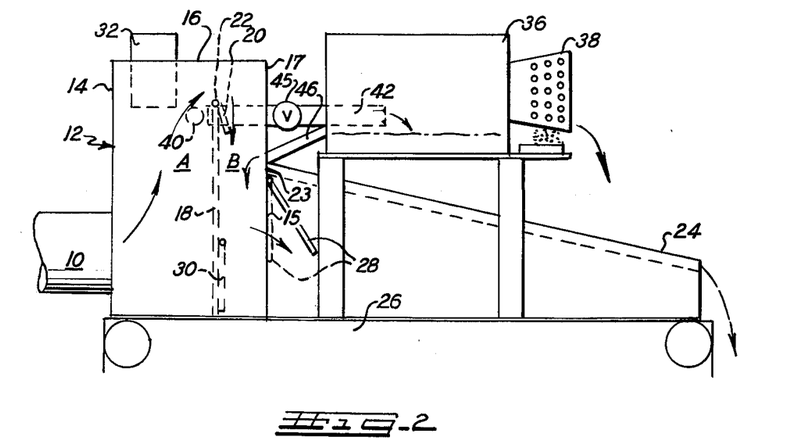
FIG. 2 is a side elevation of FIG. 1 illustrating the mud flow with the shaker screen by-passed.
Figure 3:
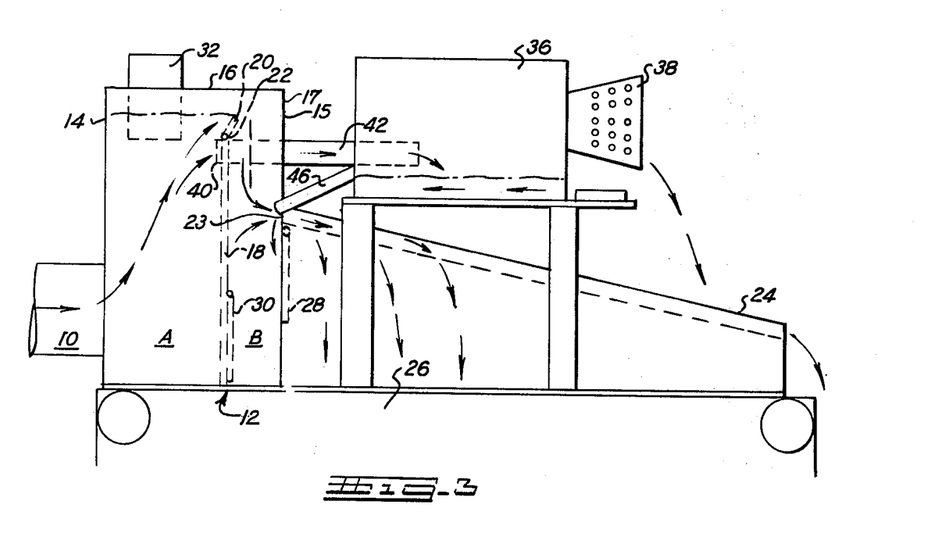
FIG. 3 is a similar side elevation of FIG. 1 showing mud flow to both the shaker screen and a cuttings sampling device.
Figure 4:
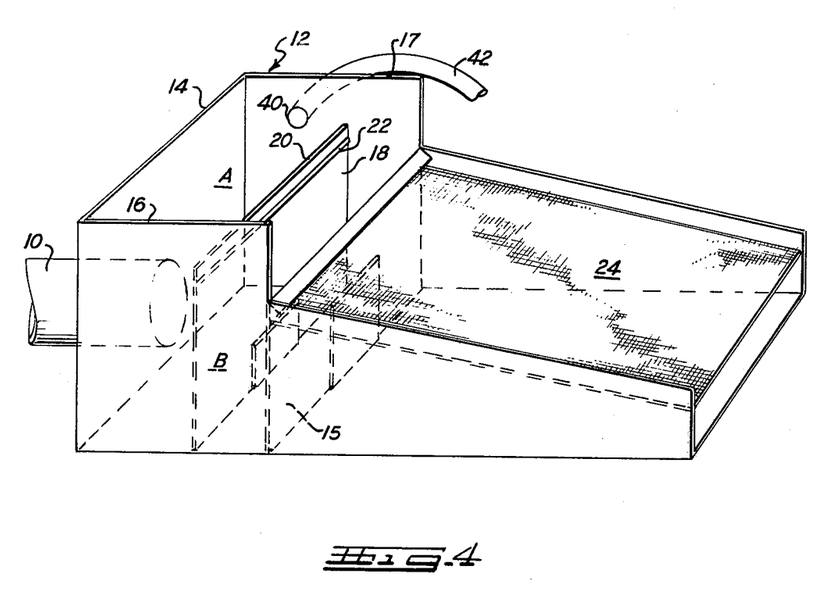
FIG. 4 is a perspective view of the riser box and shaker screen.

As shown in FIGS. 1–4, a gate 20 is hinged to the top of partition 18 by a piano type hinge 22 which may be frictionally set manually, or if desired by easy modification, mechanically, to a relatively vertical or slightly angular position as shown in FIG. 3 or a downturned position as shown in FIG. 2. Thus, the gate 20 may swing pivotally from vertical to horizontal and to a lower vertical position as in FIGS. 2 and 3 on its hinge 22.

The mud entering the chamber A fills the same to a vertical height set by the position by the gate 20 overflowing as shown in FIG. 2 into chamber B. With the gate 20 adjusted to extend toward the chamber B obliquely or horizontally, as needed to maintain a uniform fluid or mud level in chamber A, the mud stream overflowing the gate 20 will drop or spill from the edge of the gate 20 into chamber B as shown in FIG. 3. The mud in chamber B will flow outward of chamber B, the gate valve 28 being open, into a mud pit or box 26 mounted beneath the assembled units for collecting the mud, and in which the mud may be further treated, or may be directly recycled to the well (not shown). With the gate 28 closed the mud level in chamber B will rise to the height of the top 23 of the shaker screen 24 and will spill onto the shaker screen. The gate 28 may be mounted in the forward wall 15 of the riser box; however, it may be mounted in the ends 16 or 17 or even in the bottom in chamber B of the mud disposal chamber, manually accessible to open to control the alternate flows, so that when gate 28 is opened the mud spilling from the top of the partition 18 into the chamber B will pass outward into the mud pit for treatment and recirculation in the system, or when closed the mud will merely pass through chamber B on to the shaker screen 24. In this manner, the chamber A will remain filled with mud to the height of the partition and gate 20, whether or not the shaker screen 24 is in operation or is being by-passed, and the chamber B will be opened to remove mud.

Another gate 30 may be mounted near the lower end of the partition wall 18; however, it may be located in any side of or bottom of chamber A to permit drainage of all mud from the system when the rig is shut down. With the riser box thus substantially continually filled to a uniform considerable depth with mud as fixed by the partition 18 and gate 20, various test instruments such as gas extracting devices or an electrical instrument 32 having electrodes mounted to dip into the mud thus to measure accurately the electrical conditions thereof, for instance, the chemical consistency, the temperature, the viscosity, the pH and other properties listed above for which the mud is usually controlled and tested.

The level of mud in the mud supply chamber A of the riser box, maintained at the selected height by the position of the gate 20, in addition to raising the mud to a constant high level to provide for continuous testing also maintains a high mud level to allow gravity flow to a cuttings sample collecting device 36 as shown in my U.S. Pat. No. 3,662,897. As described in that patent, the device comprises a drum through which a sampling of drilling fluid continues to flow as the drum rotates. Vanes pick up cuttings and wash some of the larger cuttings, dropping them on a tilted trough which passes them out through a conical screen 38, and thence to a packaging means (not shown). A cuttings sampling portion of the mud stream is taken from an outlet 40 fixed at a point near the top of the mud supply chamber riser box, and below the surface level of the mud stream therein, and passes the same by way of duct 42 to the center of the rotating drum of the cuttings sampling device 36.

The drilling mud after removal of some cuttings for sampling purposes is returned to the main stream in a continuous flow by way of duct 46, the outlet of which communicates to drop into chamber B as shown in FIG. 3. The sampling device can be positioned to return the flow from the sampling stream directly to the open top of chamber B as shown in FIGS. 5 and 6 thus the returning mud will pass over the shale shaker when in operation. When the shale shaker is not operating as shown in FIGS. 2 and 6, the mud flow from the sample cuttings device will pass from the mud disposal chamber B with the main stream of mud and by-pass the shale shaker, and the combined mud streams flowing outward by way of gate 28, and thence to the mud pit or box 26.

In modified forms as shown in FIGS. 5–8, a constant controlled mud level chamber 12 may be mounted to, as being bolted or merely assembled closely spaced to a riser box 60 operating as a distributor for enclosing a chamber B, and which may already be mounted to a shaker screen 24. These modified chamber forms are assembled for mud flow as shown in FIGS. 5 and 6.

The housing 12 enclosing chamber A of FIGS. 5–8 serves as a constant mud level control unit and may have a hopper shaped bottom formed by slanted walls 43, vertical side walls 16 and 17, rear and front walls 14 and 18 respectively and may be open at the top. At a short distance below the top, a weir surface 44 comprising a flat shelf portion or lip is provided, extending horizontally of the chamber between sides 16 and 17, and laterally forward of partitioning wall 18, a sufficient distance to guide the mud flow thereover as a weir so that the mud may pour into the open top of chamber B mounted beneath it as shown in FIGS. 5–8.

The chamber B of the modified form of FIGS. 5 and 6 is housed in a tank 60 having a slanted bottom 62, a forward wall 15, and a rear wall 19, secured between short vertical sides 16 and 17 as shown. It has a forward extending ledge operating both as a weir portion 56 in its forward wall 15, and that ledge may also constitute an engaging support for mounting of the box 60 close to the upper end of the shale shaker extending forward and inward a short portion thereof. This provides a wide open top for the box 60 for receiving both the returned flow of mud fluid from the sampling means 36, as well as the main flow of mud feed passing therein from over the weir 44 from the mud supply chamber A. The wall 15 is open at 58, a point above and near the top of the shale shaker mounted thereto to allow flow of mud from the chamber B over the weir onto the upper end of the shale shaker. Gate 28 hinged immediately below the shale shaker 24 in the wall 15 is normally closed as in FIG. 5 to allow such flow, but may be open for purposes of by-passing the shale shaker as shown in FIG. 6.

Thus, in operation as shown in FIG. 5 with the gate 28 closed, mud entering the chamber A by way of duct 10 rises to an upper level as shown, above an outlet 40 and slightly above the weir 44, spilling in the direction of the arrows to a lower level of distribution chamber B and thence over the upper end 23 of the shale shaker 24. Simultaneously mud enters the duct 42 through inlet 40 in the chamber. A flowing and depositing the same in the sampling device 36. The sampling device in its rotation removes cuttings, spilling them out of one end in a stream 55 for packaging, and from the opposite end the mud returns, as shown by the arrows 59 into the open top of chamber B. As shown in FIG. 6, with a gate 28 open, the shale shaker 24 will be by-passed and the main mud stream following arrows 57 will pass outward and into the mud pit. Simultaneously, the mud stream in duct 42 continues to be passed to the sampling device 36 through duct 42 returning as before, as shown by arrows 59, to the main stream passing thence with the main stream according to arrows 57 to the mud pit 26.

As thus described, a riser box is provided which is partitioned or constructed to form an internal weir formed or adjusted to a selected height thereby to maintain a constant head of mud in a supply chamber, providing a selected hydrostatic depth to the mud maintained at the selected constant height or level characteristic of the spent mud. The main stream of said mud spilling over the gate 20 or over a ledge 44 as a weir may be passed to a shaker screen 24 and screened for removal of solids, dropping thence into a mud box 26. Alternately, for various reasons, the shaker screen 24 is by-passed, and the mud stream is diverted, by opening gate 28 passing the mud thence to mud box 26.

In a modified form shown in FIG. 8, the distribution tank 50 is elongated and widely flared with a hopper bottom and side wings having a pair of outlets 54 surrounded by flanges 53 which pass the mud onto a pair of shale shaker screens (not shown), both supplied by the single mud distribution chamber B. The shale shaker thus operate as a pair may be separated and the sand cuttings sampling device 36 may be mounted as shown in FIGS. 5 and 6 between the shale shakers, with inlet and outlet ends thereof disposed above the open top 61 of the tank 50 so that return of the spent mud from the sampling device to the distribution chamber B is the same as shown in FIGS. 5 and 6. The constant mud level chamber 12 is mounted close or near to the distribution chamber B and to discharge its mud flow over its weir 44 into the open top of the chamber B. The discharge gate 28 may be mounted centrally for by-pass of the shale shakers, and similarly, the inlet duct 42 is disposed centrally for a supply of mud in gravitational flow from the mud level chamber directly to the cutting sampling device 36 intermediate both shale shakers.

As described, the hydrostatic head in chamber A provides a gravity flow for a portion of the mud to be passed to a cuttings sampling device 36, mounted beside or on a frame over the shale shaker or intermediate between two shale shakers with a duct to return the mud from cuttings sampling device 36 to chamber B, or by positioning, directly returning the sampled mud to the distribution chamber B. In that manner, an improved riser box is provided to allow both testing continuously by various instruments suspended below the raised surface in a useful level of the mud to measure its properties as it flows, and to also raise the mud hydrostatically for gravity flow so that it can flow from an adjusted height onto a shaker screen for removal of large particles, when the shaker screen is available for operation, or alternately for disposal in chamber B at a low level.

While it is contemplated that the assembled mud level and mud distribution chambers be assembled together into an integral unit, separable units, and also closely arranged units, for operation and usually for sale together as a pair, with or without one assembly, the mud distribution unit may also be sold as an integral part of a shale shaker as is usual for a riser box, and the mud level unit may then be handled separately, and independently coupled to a shale shaker having a riser box and distribution chamber pre-assembled therewith.

Certain modifications will occur to those skilled in the art, and accordingly, it is intended that the description given herein be regarded as exemplary and not limiting, except as defined in the claims.

I claim:
1. In a drilling mud handling system, a first housing enclosing a constant mud level control chamber and a second housing enclosing a mud distribution chamber each housing being mounted close to the other, a wall of said mud level control chamber near the mud distribution chamber being cut away and open to an adjustable distance below the top of said first housing defining a selected mud level therein and to provide a weir at an adjusted height over which the mud in the said mud lever control chamber overflows into the nearby second housing enclosing said mud level disposal chamber, said mud disposal chamber having a side opposite to the weir of said mud level control chamber open at a selected intermediate height below the weir level of said mud level control chamber, a mud treating means positioned to receive mud flowing over said weir and outward from said open intermediate height opening of said mud distribution chamber, and valve means below said opening of said mud disposal chamber controlling the flow of mud therethrough the alternate discharge and disposal of accumulated mud in said disposal chamber, means for passing drilling mud into said mud level control chamber and means communicating with the upper level of mud in said mud level control chamber fixed by the position of said weir for testing the quality of the mud in continuous flow through said mud level control chamber.

2. The drilling mud handling system as defined in claim 1 wherein said mud treating means is a shale shaker comprising an inclined screening means having its upper end disposed to receive and treat mud flowing outward from said open intermediate height opening of said mud distribution chamber.

3. In a drilling mud handling system, a riser box having a vertical partition forming a weir near its top and extending from side to side across the interior of said riser box from the bottom to a selected height and separating said riser box into a mud level control chamber and a mud disposal chamber, whereby mud passed to said supply chamber rises therein to the level of said weir and flows over into said partition-separated mud disposal chamber in a cascade, an opening in an outer wall of said mud disposal chamber at a level below the level of said weir through which mud in said distribution chamber may flow for further treatment, valve means in an exterior wall of the disposal chamber below the said opening therein communicating with said mud disposal chamber and controlling the flow of mud therethrough, said valve, in closed position, controlling discharge and disposal of accumulated mud in said disposal chamber in an alternate stream, means for adjusting the height of said partition and weir, means for passing drilling mud into said mud supply chamber, and means, communicating with the controlled upper level of mud in said control chamber fixed by said partition and weir, for testing the mud passing through said chamber.

4. The drilling mud handling system as defined in claim 3 combined with an alternately operative shale shaker for receiving and further treating said mud, said mud disposal chamber having said opening cut away at an intermediate height of said outer wall position, said shale shaker having its inlet section disposed adjacent to said cutaway wall portion of said disposal chamber and positioned to receive mud flowing from said cutaway level onto the said shaker screen in continuous gravity flow of said mud from said disposal chamber.

5. The drilling mud handling system as defined in claim 3 wherein said weir comprises a gate hingedly mounted to the top of said partition including positioning means for adjusting the height thereof by its hinged position between horizontal and vertical.

6. The drilling mud handling system as defined in claim 5 wherein the gate is hingedly mounted to the top of said partition and manually positioned for adjusting the height thereof by its selected hinged position between horizontal and vertical and providing said weir, said riser box having its mud disposal chamber disposed near the inlet of a shale shaker for said mud treatment, said weir adjustably varying the height of the mud in said mud level control chamber and transferring the drilling fluid into the adjacent partitioned mud disposal chamber side to the surface of said shale shaker, the valve means being closed, or to an alternate disposal area, said valve means being open.

7. The drilling mud handling system as defined in claim 1 combined with a mud sampling device and duct means interconnecting the mud level control chamber at a point to below its upper level and passing a portion of said mud, as a mud sampling stream, to said mud sampling device by gravity flow from said chamber.

8. A drilling mud handling system as defined in claim 1 combined with a shale shaker and a mud sampling device, said shale shaker comprising an inclined screen having its upper end disposed to receive and treat mud flowing outward from said open intermediate height opening of said mud distribution chamber, and duct means interconnecting the mud level control chamber at a point below its upper mud level and passing a portion of said mud as a mud sampling stream to said sampling device by gravity flow from said mud level control chamber.

9. The drilling mud handling system combined with a shale shaker and a mud sampling device as defined in claim 8, said mud sampling device including means for returning mud from said mud sampling stream after removal of samplings to said mud disposal chamber.

10. In a drilling mud handling system, the combination of a riser box, a shale shaker, and mud sampling means, said box being separated into a mud level control chamber and a mud disposal chamber, said box having an adjustable partition extending to a selected intermediate height of said box and forming a weir over which the mud may flow from chamber to chamber, said shale shaker having an adjustable forward end connecting with the outward mud flow from said mud disposal chamber alternately disposable to receive the mud or be by-passed by said mud flow, said mud sampling device communicating with said mud level control chamber below the mud height set by said weir, whereby mud passes in gravity flow to said mud sampling device and to said shale shaker in gravity flow each independently of the other, and a mud flow controlling gate means below said shaker level in said mud disposal chamber to remove mud therefrom.

11. The combination as defined in claim 10 wherein a gate means is hingedly fastened to the top of said partition, and is angularly moveable with respect to the plane thereof whereby to raise and lower the height of said partition and the mud level control chamber in said mud supply chamber and to direct the angle of mud flow over the top of said partition as a weir.

12. The drilling mud handling system as defined in claim 10 wherein said riser box has a vertical partition extending upward to a substantial level from the bottom and from side to side of said box dividing said riser box into a mud level control chamber, said partition having means for adjusting its height, means communicating with the upper mud level of said mud level control chamber for testing the quality of mud therein, at least one opening in said disposal chamber at an intermediate level for passing mud therefrom to at least one shale shaker.

13. The riser box combination as defined in claim 12 wherein said partition has a gate means angularly moveable with respect to the plane thereof whereby to raise and lower the height of said partition and the mud supply level in said mud supply chamber, and means for returning the sampled mud stream from said mud sampling means back to said mud disposal chamber.

14. The riser box as defined in claim 12 including a mud sampling device for removal of samples from a mud stream, said sampling device being mounted near said box, duct means communicating with said mud level control chamber at a point beneath the mud level therein for gravity flow of the mud stream into said sampling device and means for returning sampled mud from said sampling device in gravity flow to said disposal chamber, a shale shaker mounted to receive mud flow outward from said intermediate opening of said disposal chamber alternately operative when said gate means is closed and the mud level in said disposal chamber rises above the level of said opening, and inoperative when said gate means is open reducing the mud level in said disposal chamber when said gate means is open.

15. A riser box as defined in claim 1 including test instruments mounted near the top thereof with a portion extending to a position beneath the top in said mud supply chamber with a test end immersed in the mud below the level thereof fixed by said partitioning element.

16. The drilling mud handling system as defined in claim 1 wherein the lower portion of said housing of said mud level control chamber is hopper-shaped to increase the flow velocity of mud therein.

17. The drilling mud handling system as defined in claim 1 wherein said first housing and said second housing are disposed as separate housings, separated by a space but mounted close to each other for operation together.

18. The drilling mud handling system as defined in claim 1 wherein the first housing and second housing are separably fastened together.

19. The drilling mud handling system as defined in claim 1 wherein said second housing has a pair of openings in the outer wall thereof at a selected intermediate height below the weir level of said mud control chamber, and a pair of mud treating means are each positioned to receive mud flowing outward from each of said intermediate height openings of said mud distribution chamber, and valve means disposed below said openings in said disposal chamber controlling the flow of mud therethrough for alternate discharge and disposal of accumulated mud in said disposal chamber when said valve means is open, and for constraining the outward flow and causing the mud level in said disposal chamber to rise to the said intermediate height and flow outward to said mud treating means when said valve means is closed.

20. The drilling mud handling system as defined in claim 19 wherein said mud treating means is a pair of shale shakers each mounted to one of said intermediate height openings, and a mud sampling device mounted beside said shale shakers having mud stream conducting duct means communicating with said mud level control chamber flowing mud for removal of samplings from a point beneath the surface of the mud level therein to said sampling device and returning the sampled mud stream to said distribution chamber by gravity flow.

* * * * *

UNITED STATES PATENT OFFICE
CERTIFICATE OF CORRECTION

PATENT NO. : 3,988,243
DATED : October 26th, 1976
INVENTOR(S) : Kenneth O. Huff

It is certified that error appears in the above-identified patent and that said Letters Patent are hereby corrected as shown below:

Column 6,

Line 67, before "alternate" the second occurance in the line "the" should be -- for --.

Fig. 5, the lead line to the numeral 44 should be an arrow and it should point downward.

Signed and Sealed this

Twenty-ninth Day of March 1977

[SEAL]

*Attest:*

RUTH C. MASON
*Attesting Officer*

C. MARSHALL DANN
*Commissioner of Patents and Trademarks*